(12) United States Patent
Yokoyama et al.

(10) Patent No.: US 11,390,187 B2
(45) Date of Patent: Jul. 19, 2022

(54) MANAGEMENT DEVICE, MANAGEMENT METHOD, AND PROGRAM

(71) Applicant: HONDA MOTOR CO., LTD., Tokyo (JP)

(72) Inventors: Shinichi Yokoyama, Wako (JP); Keiichiro Homma, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 42 days.

(21) Appl. No.: 16/882,906

(22) Filed: May 26, 2020

(65) Prior Publication Data
US 2020/0384887 A1   Dec. 10, 2020

(30) Foreign Application Priority Data

May 28, 2019  (JP) .............................. JP2019-099361

(51) Int. Cl.
*H02J 7/00*  (2006.01)
*B60L 58/14*  (2019.01)
(Continued)

(52) U.S. Cl.
CPC .............. *B60L 58/14* (2019.02); *B60L 53/00* (2019.02); *B60L 55/00* (2019.02); *B60L 58/10* (2019.02);
(Continued)

(58) Field of Classification Search
CPC .......... B60L 58/14; B60L 53/00; B60L 55/00; B60L 58/10; B60L 58/22; B60L 58/24; B60L 58/12; Y02T 90/16
(Continued)

(56) References Cited

U.S. PATENT DOCUMENTS

| 2011/0202217 A1* | 8/2011 | Kempton | H02J 3/008 701/22 |
| 2014/0266070 A1* | 9/2014 | Kurtzman | H02J 7/345 320/149 |
| 2019/0288347 A1 | 9/2019 | Yokoyama et al. | |

FOREIGN PATENT DOCUMENTS

| JP | 2003-297435 | 10/2003 |
| JP | 2005-124353 | 5/2005 |
| | (Continued) | |

OTHER PUBLICATIONS

Japanese Office Action for Japanese Patent Application No. 2019-099361 dated Mar. 9, 2021.

*Primary Examiner* — Zixuan Zhou
(74) *Attorney, Agent, or Firm* — Amin, Turocy & Watson, LLP

(57) ABSTRACT

A management device manages transfer of electric power between an electric power system and a secondary battery that is mounted in a vehicle and stores electric power for travel. The management device includes an acquisition unit configured to acquire remaining performance of the secondary battery and information indicating a use period of the secondary battery, and a control unit configured to acquire two or more threshold values corresponding to period information based on a use period of the secondary battery from reference information in which two or more threshold values are associated with the period information based on the use period of the secondary battery, compare remaining performance of the secondary battery with each of the two or more acquired threshold values, and control transfer of electric power between the electric power system and the secondary battery on the basis of a result of the comparison.

7 Claims, 5 Drawing Sheets

(51) Int. Cl.
   *B60L 58/24*  (2019.01)
   *B60L 55/00*  (2019.01)
   *B60L 58/22*  (2019.01)
   *B60L 58/10*  (2019.01)
   *B60L 53/00*  (2019.01)
   *B60L 58/12*  (2019.01)

(52) U.S. Cl.
   CPC ............... *B60L 58/22* (2019.02); *B60L 58/24* (2019.02); *B60L 58/12* (2019.02); *Y02T 90/16* (2013.01)

(58) Field of Classification Search
   USPC ............................................ 320/109; 701/22
   See application file for complete search history.

(56) References Cited

FOREIGN PATENT DOCUMENTS

| | | |
|---|---|---|
| JP | 2008-024124 | 2/2008 |
| JP | 2017-175736 | 9/2017 |
| JP | 2019-033605 | 2/2019 |
| JP | 2019033605 A * | 2/2019 |
| WO | 2018/084151 | 5/2018 |
| WO | 2018/084152 | 5/2018 |

\* cited by examiner

FIG. 2

| VEHICLE IDENTIFICATION INFORMATION | REGISTRATION DATE | BATTERY INFORMATION |
|---|---|---|
| AAA | YYYY.MM.DD | XXX |

FIG. 3

| REMAINING WARRANTY PERIOD | FIRST THRESHOLD VALUE | SECOND THRESHOLD VALUE |
|---|---|---|
| 15 YEARS | 0.8 | 0.9 |
| 14 YEARS | 0.75 | 0.85 |
| 13 YEARS | 0.70 | 0.80 |
| ... | | |
| 3 YEARS | 0.XX | 0.75 |
| 2 YEARS | 0.XX | 0.XX |
| 1 YEAR | 0.XX | 0.XX |

FIG. 5

| AMBIENT TEMPERATURE | CORRECTION VALUE |
|---|---|
| −10 DEGREES | H1 |
| −5 DEGREES | H2 |
| 0 DEGREE | H3 |
| 5 DEGREES | H4 |
| ... | ... |

MANAGEMENT DEVICE, MANAGEMENT METHOD, AND PROGRAM

CROSS-REFERENCE TO RELATED APPLICATION

Priority is claimed on Japanese Patent Application No. 2019-099361, filed May 28, 2019, the content of which is incorporated herein by reference.

BACKGROUND OF THE INVENTION

Field of the Invention

The present invention relates to a management device, a management method, and a program.

Description of Related Art

In recent years, electric vehicles have been widely used. An electric vehicle is equipped with a battery (for example, a secondary battery), electricity is stored in the secondary battery, and the vehicle travels by electric power being supplied from the secondary battery to a motor at the time of travel. For this reason, a user of the electric vehicle stores the electricity in the secondary battery of the electric vehicle, for example, at charging stations provided at various locations, a home, or the like.

In addition, a social system called vehicle to grid (V2G) has been proposed. In V2G, electric power is exchanged between an electric power system including a commercial electric power network and an electric vehicle (refer to PCT International Publication No. WO2018/084152). In V2G, when an electric vehicle is not used as a means of transportation, a secondary battery mounted in the electric vehicle is used as an electric power storage facility in the commercial electric power network. For this reason, bidirectional transfer of electric power is performed between the electric vehicle and the electric power system participating in V2G.

SUMMARY OF THE INVENTION

As described above, since the electric power is supplied from the secondary battery to the electric power system in a social system to which V2G is applied, an energizing time of the secondary battery increases as compared with when V2G is not performed. As described above, deterioration of the secondary battery may be promoted by an increase in the energizing time to the secondary battery. However, in the conventional art, it has not been easy to perform control such that the deterioration of the secondary battery is reduced by guaranteeing the performance of the secondary battery in a guarantee period of the operation of a vehicle, and maintaining the traveling of the vehicle while operating V2G in some cases.

Aspects according to the present invention have been made in view of such circumstances, and an object thereof is to provide a management device, a management method, and a program that can reduce deterioration of a secondary battery while operating transfer of electric power between an electric power system and a secondary battery mounted in a vehicle and storing electric power for travel.

The present invention has adopted the following aspects to solve the problems described above and to achieve the object.

(1): A management device according to one aspect of the present invention is a management device which manages transfer of electric power between an electric power system and a secondary battery that is mounted in a vehicle and stores electric power for travel, and includes an acquisition unit configured to acquire remaining performance of the secondary battery and information indicating a use period of the secondary battery, and a control unit configured to acquire two or more threshold values corresponding to period information based on a use period of the secondary battery from reference information in which two or more threshold values are associated with the period information based on the use period of the secondary battery, compare remaining performance of the secondary battery with each of the two or more acquired threshold values, and control transfer of electric power between the electric power system and the secondary battery on the basis of a result of the comparison.

(2): In the aspect of (1) described above, the two or more threshold values may include a first threshold value, and a second threshold value indicating that the remaining performance is higher than the first threshold value, and the control unit may restrict the transfer of electric power between the electric power system and the secondary battery when the remaining performance of the secondary battery is less than the first threshold value.

(3): In the aspect (1) or (2) described above, the two or more threshold values may include a first threshold value, and a second threshold value indicating that the remaining performance is higher than the first threshold value, and the control unit may control, when the remaining performance of the secondary battery is equal to or more than the first threshold value and less than the second threshold value, a state of charge of the secondary battery in a narrower range than when the remaining performance is equal to or more than the second threshold value.

(4): In the aspect of any one of (1) to (3) described above, the two or more threshold values may include a first threshold value, and a second threshold value indicating that the remaining performance is higher than the first threshold value, the control unit may perform control such that frequency regulation control for maintaining a constant frequency of the electric power system is performed on the vehicle near a lower limit state of charge when the remaining performance of the secondary battery is equal to or more than the first threshold value and less than the second threshold value, the lower limit state of charge being a state of charge at which the secondary battery can output an amount of electric power consumed by traveling a distance preset by a driver for the next time the vehicle travels.

(5): In the aspect of any one of (1) to (4) described above, the two or more threshold values may include a first threshold value, and a second threshold value indicating that the remaining performance is higher than the first threshold value, the control unit may perform control such that frequency regulation control for maintaining a constant frequency of the electric power system is performed on the vehicle between a frequency control state of charge having a state of charge higher than a lower limit state of charge and the lower limit state of charge when the remaining performance of the secondary battery is equal to or more than the second threshold value, the lower limit state of charge being a state of charge at which the secondary battery can output an amount of electric power consumed by traveling a distance preset by a driver for the next time the vehicle travels.

(6): A management method according to another aspect of the present invention is a management method which includes, by a management device that manages transfer of electric power between an electric power system and a secondary battery that is mounted in a vehicle and stores electric power for travel, acquiring remaining performance of the secondary battery and information indicating a use period of the secondary battery, acquiring two or more threshold values corresponding to period information based on the use period of the secondary battery from reference information in which two or more threshold values are associated with the period information based on the use period of the secondary battery, comparing the remaining performance of the secondary battery with each of the two or more acquired threshold values, and controlling the transfer of electric power between the electric power system and the secondary battery on the basis of a result of the comparison.

(7): A computer-readable non-transitory storage medium stores a program causing a computer of a management device that manages transfer of electric power between an electric power system and a secondary battery that is mounted in a vehicle and stores electric power for travel to acquire remaining performance of the secondary battery and information indicating a use period of the secondary battery, acquire two or more threshold values corresponding to period information based on the use period of the secondary battery from reference information in which two or more threshold values are associated with the period information based on the use period of the secondary battery, compare the remaining performance of the secondary battery with each of the two or more acquired threshold values, and control the transfer of electric power between the electric power system and the secondary battery on the basis of a result of the comparison.

According to the aspect of (1) to (7) described above, remaining performance of a secondary battery is compared with a first threshold value and a second threshold value, and transfer of electric power between an electric power system and the secondary battery is controlled on the basis of a result of the comparison, and thereby it is possible to reduce deterioration of the secondary battery while operating the transfer of electric power between the electric power system and a secondary battery that is mounted in a vehicle and stores electric power for travel.

According to the aspect of (2) described above, V2G control is restricted (including prohibited) for a deteriorated secondary battery, and thereby it is possible to reduce excessive deterioration of the secondary battery.

According to the aspect of (3) described above, a range of a state of charge in which charging of a secondary battery is performed is changed according to the deterioration of the secondary battery, and thereby it is possible to perform control in accordance with the deterioration of a battery.

According to the aspect of (4) described above, control is performed such that frequency regulation is performed near a lower limit state of charge. And thereby it is possible to perform control in accordance with deterioration of a battery.

According to the aspect of (5) described above, control is performed such that V2G is performed between a frequency control state of charge and a lower limit state of charge, and thereby it is possible to perform control in accordance with the deterioration of a battery.

BRIEF DESCRIPTION OF THE DRAWINGS

FIG. 2 is a diagram which shows an example of information stored in a vehicle storage unit of a vehicle according to the embodiment.

FIG. 3 is a diagram which shows an example of information stored in a storage unit of the management device according to the embodiment.

FIG. 5 is a diagram which shows an example of a correction value for each ambient temperature for a battery remaining performance according to the embodiment.

DETAILED DESCRIPTION OF THE INVENTION

Hereinafter, embodiments of a management device, a management method, and a program of the present invention will be described with reference to the drawings. In the following description, it is assumed that a vehicle is an electric vehicle equipped with a secondary battery, but the vehicle is a vehicle that can store electric power from the outside. The vehicle may be a vehicle equipped with a secondary battery that supplies electric power for travel and may also be a hybrid vehicle or a fuel cell vehicle.

[Outline of V2G System]

First, an outline of a vehicle to grid (V2G) system will be described. The V2G system is a system in which electric power is exchanged between an electric power system including a commercial electric power network and the vehicle 300. In the V2G system, when a vehicle is not used as a means of transportation, a secondary battery mounted in the vehicle is used as an electric power storage facility. For this reason, bidirectional transfer of electric power is performed between the electric power system and vehicles participating in V2G.

Vehicles participating in V2G perform continuous discharging for a purpose of maintaining a supply-demand balance in the electric power system or charging and discharging for a purpose of stabilizing a frequency in the electric power system according to a situation of the electric power system. Electric power obtained by the continuous discharging of vehicles for the purpose of maintaining the supply-demand balance is used as a "spinning reserve" of the electric power system. The continuous discharging for the spinning reserve is performed for a purpose of supplying electric power to the electric power system, which is required to maintain the supply-demand balance, particularly as an electric power demand in the electric power system increases. Moreover, electric power transferred by the charging and discharging of vehicles for the purpose of stabilizing a frequency is used for "frequency regulation" of the electric power system. In each case, the vehicles contribute to the stabilization of the electric power system.

[Overall Configuration]

Figure 1:
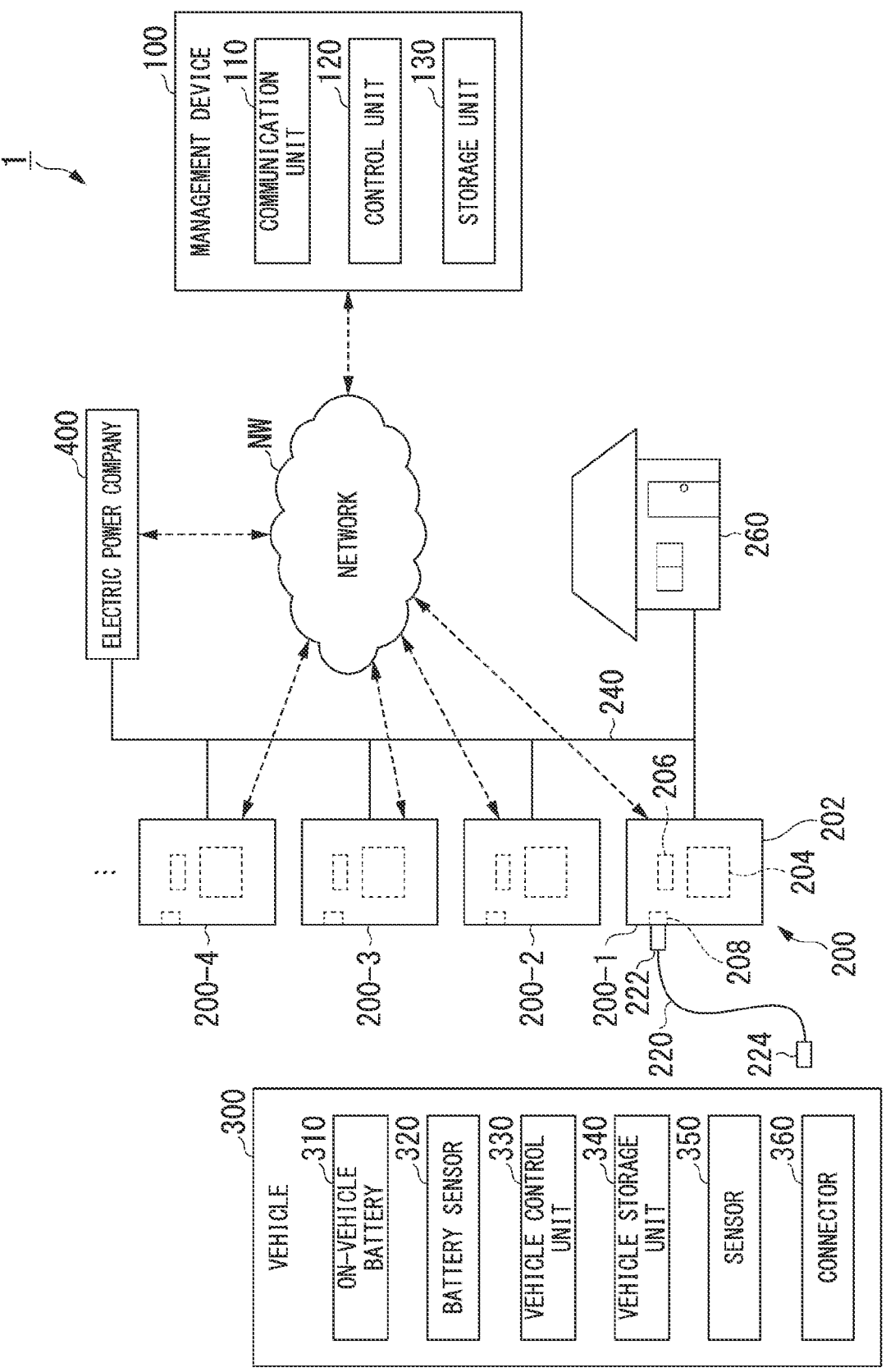
FIG. 1 is a diagram which shows an example of a configuration and a use environment of a V2G system including a management device according to an embodiment.

FIG. 1 is a diagram which shows an example of a configuration and a use environment of a V2G system 1 including a management device 100 according to an embodiment. As shown in FIG. 1, the V2G system 1 includes a management device 100, a plurality of external power supply devices 200 (200-1, 200-2, 200-3, 200-4, . . . , and so forth), a vehicle 300, and an electric power company 400. Note that, when one of the external power supply devices 200-1, 200-2, 200-3, 200-4, . . . , and so forth is not identified, these may be collectively referred to as an external power supply device 200 in the following description. Note that one vehicle 300 is shown in FIG. 1, but there may be a plurality of vehicles 300.

An example of a user environment of the V2G system 1 will be described with reference to FIG. 1.

The external power supply device 200 is installed in, for example, a home 260 of a user of the vehicle 300, a company in which the user works, an accommodation used by the user, and the like. The user connects, for example, the vehicle 300 to the external power supply device 200 when returning home. The management device 100 performs control such that electric power is supplied to the vehicle 300 via the external power supply device 200, and performs control such that electric power is exchanged between the electric power system including the commercial electric power network and the electric vehicle. The external power supply device 200 and the electric power company 400 are connected via a transmission line 240. The management device 100 and the external power supply device 200 are connected via a network NW. The vehicle 300 and the external power supply device 200 are connected via a cable 220. The cable 220 is a feeding cable and may include a signal line. Alternatively, the cable 220 may have a signal superimposed on the feeding cable. Note that the network NW includes, for example, the Internet, a wide area network (WAN), a local area network (LAN), a provider device, a wireless base station, and the like.

[Electric Power Company 400]

The electric power company 400 includes a power generation plant that generates power by energy such as thermal power, wind power, nuclear power, or solar power, and supplies, for example, electric power to an allocated area. Note that the region herein may be defined in any manner, and the region may be, for example, defined in units of administrative divisions such as prefectures or municipalities, or may be defined in units of sub-jurisdiction of substations. The electric power company 400 transmits an instruction (providing of frequency regulation and spinning reserve) for the charging and discharging of the on-vehicle battery 310 mounted in the vehicle 300 according to the electric power demand to the management device 100 via the network NW. The example shown in FIG. 1 is an example of one region, and the electric power company 400 is one example.

[Management Device 100]

The management device 100 includes a communication unit 110 (acquisition unit), a control unit 120, and a storage unit 130.

The management device 100 communicates with the electric power company 400 via the network NW. The management device 100 communicates with the plurality of external power supply devices 200 via the network NW. The management device 100 manages electric power on the basis of information transmitted from the electric power company 400. The management device 100 manages charging and discharging of the on-vehicle battery 310 of the vehicle 300 connected to the external power supply device 200, thereby providing a spinning reserve from the vehicle 300 to an electric power system or performing a frequency regulation of the electric power system. As a result, the management device 100 controls the charging and discharging of the on-vehicle battery 310 of the vehicle 300 to meet a request from the electric power company 400. Note that the management device 100 causes a target SOC to be changed at the time of frequency regulation in V2G according to a battery deterioration situation on the basis of information (vehicle information, ambient temperature information indicating an ambient temperature of the on-vehicle battery 310) acquired from the vehicle 300 via the external power supply device 200.

The communication unit 110 receives a request from the electric power company 400 via the network NW. The request received from the electric power company 400 is a frequency regulation request or a spinning reserve request. The communication unit 110 outputs the received frequency regulation request or spinning reserve request to the control unit 120. The communication unit 110 transmits or receives information to or from the external power supply device 200 via the network NW. The communication unit 110 transmits an SOC setting instruction, a frequency regulation instruction, or a spinning reserve instruction output from the control unit 120 to the external power supply device 200 via the network NW. The communication unit 110 outputs the vehicle information and the ambient temperature information received from the external power supply device 200 to the control unit 120.

The control unit 120 acquires the vehicle information and the ambient temperature information output by the communication unit 110. The control unit 120 calculates a remaining warranty period, which is a remaining period for which the operation of a vehicle (or the on-vehicle battery 310) needs to be guaranteed, on the basis of a current date and time and a registration date and time information included in the vehicle information output by the communication unit 110. Note that the remaining warranty period is an example of period information based on a use period of the on-vehicle battery 310 (secondary battery). The control unit 120 calculates battery remaining performance on the basis of battery information included in the vehicle information output by the communication unit 110. Note that the control unit 120 may calculate the battery remaining performance on the basis of the battery information and the ambient temperature information. The control unit 120 reads a first threshold value and a second threshold value associated with the remaining warranty period from the storage unit 130. The control unit 120 compares the battery remaining performance with the first threshold value and the second threshold value, and generates an SOC setting instruction (an instruction to control a V2G operation for the secondary battery) to control the on-vehicle battery 310 mounted in the vehicle 300 on the basis of a result of the comparison. The control unit 120 outputs the generated SOC setting instruction to the communication unit 110 by setting the transmission destination to the external power supply device 200. Moreover, the control unit 120 acquires a frequency regulation request (an instruction to control the V2G operation for the secondary battery) or a spinning reserve request (an instruction to control the V2G operation for the secondary battery) output by the communication unit 110. The control unit 120 sets the frequency regulation request output by the communication unit 110 as a frequency regulation instruction, sets the transmission destination to the external power supply device 200, and outputs the instruction to the communication unit 110. The control unit 120 sets the spinning reserve request output by the communication unit 110 as a spinning reserve instruction, sets the transmission destination to the external power supply device 200, and outputs the instruction to the communication unit 110. Note that a method of calculating the remaining warranty period, a method of generating the SOC setting instruction, battery remaining performance, a first threshold value, and a second threshold value will be described below.

The storage unit 130 stores a first threshold value and a second threshold value in association with each remaining warranty period for which the vehicle 300 needs to be guaranteed. Note that the storage unit 130 stores a first threshold value and a second threshold value in association with each remaining warranty period for each type of the on-vehicle battery 310 when there are a plurality of types of the on-vehicle battery 310.

[External Power Supply Device 200]

The external power supply device 200 includes a housing 202, a control device 204, a communication unit 206, and a cable connection port 208.

Each of the external power supply devices 200 communicates with the management device 100 via the network NW. A transmission line 240 is connected to the external power supply device 200, and the vehicle 300 is connected to the external power supply device 200 via the cable connection port 208 and the cable 220. The external power supply device 200 outputs the SOC setting instruction, the frequency regulation instruction, or the spinning reserve instruction received from the management device 100 via the network NW to the vehicle 300 via the cable connection port 208 and the cable 220. The external power supply device 200 acquires the vehicle information and the ambient temperature information output from the vehicle 300 via the cable 220 and the cable connection port 208. The external power supply device 200 transmits the acquired vehicle information and ambient temperature information to the management device 100 via the network NW. The external power supply device 200 supplies electric power to the vehicle 300 via the transmission line 240 when the on-vehicle battery 310 mounted in the vehicle 300 stores electric power. The external power supply device 200 supplies electric power to the transmission line 240 when the on-vehicle battery 310 is discharged. Note that the external power supply device 200 may include a charging and discharging control unit. In this case, the external power supply device 200 may control the charging and discharging of the on-vehicle battery 310 on the basis of the SOC setting instruction, the frequency regulation instruction, or the spinning reserve instruction.

The control device 204 and the communication unit 206 are incorporated in the housing 202.

The control device 204 acquires the vehicle information and the ambient temperature information output from the vehicle 300 via the cable 220 and the cable connection port 208. The control device 204 sets the transmission destination to the management device 100, and outputs the acquired vehicle information and ambient temperature information to the communication unit 206. The control device 204 outputs the SOC setting instruction, the frequency regulation instruction, or the spinning reserve instruction output by the communication unit 206 to the vehicle 300 via the cable 220 and the cable connection port 208.

The communication unit 206 receives the SOC setting instruction, the frequency regulation instruction, or the spinning reserve instruction transmitted by the management device 100 via the network NW, and outputs the received SOC setting instruction, frequency regulation instruction, or spinning reserve instruction to the control device 204. The communication unit 206 transmits the vehicle information and the ambient temperature information output by the control device 204 to the management device 100 via the network NW.

The cable connection port 208 is formed to be open on an outer surface of the housing 202. The cable 220 can be connected to the cable connection port 208.

The cable 220 includes a first plug 222 and a second plug 224. The first plug 222 is connected to the cable connection port 208 of the external power supply device 200, and the second plug 224 is connected to a connector 360 of the vehicle 300.

[Vehicle 300]

The vehicle 300 includes an on-vehicle battery 310 (a secondary battery), a battery sensor 320, a vehicle control unit 330, a vehicle storage unit 340, a sensor 350, a connector 360 (a transmitter/receiver). Note that the vehicle 300 includes an inverter, a motor, a transmission, wheels, and the like, even though not shown.

The on-vehicle battery 310 is, for example, a secondary battery such as a lithium ion battery. The on-vehicle battery 310 stores electric power and discharges the stored electric power under control of the vehicle control unit 330.

The battery sensor 320 detects, for example, a current value and a voltage value of the on-vehicle battery 310, and outputs the detected current value and voltage value to the vehicle control unit 330.

The vehicle control unit 330 calculates a state of charge (SOC) of the on-vehicle battery 310, for example, for each predetermined time according to, for example, a current integration method or an open circuit voltage (OCV) estimation method on the basis of a current value and a voltage value of the on-vehicle battery 310 output from the battery sensor 320. The vehicle control unit 330 controls the charging and discharging to the on-vehicle battery 310 on the basis of the SOC setting instruction output by the external power supply device 200 and the calculated SOC. The vehicle control unit 330 acquires the ambient temperature information output by the sensor 350. The vehicle control unit 330 reads the vehicle information stored by the vehicle storage unit 340. The vehicle control unit 330 associates the ambient temperature information with the vehicle information, and outputs the information to the external power supply device 200 via the connector 360 and the cable 220. Note that the vehicle control unit 330 may output the vehicle information and the ambient temperature information when an information acquisition instruction is acquired from the external power supply device 200 via the connector 360. In addition, the vehicle control unit 330 acquires the frequency regulation instruction output by the external power supply device 200, and performs frequency regulation control at an SOC corresponding to battery remaining performance as described below according to the acquired frequency regulation instruction. Moreover, the vehicle control unit 330 acquires the spinning reserve instruction output by the external power supply device 200, and performs control such that electric power is supplied to the electric power system according to the acquired spinning reserve instruction. When the vehicle 300 is not connected to the external power supply device 200, the vehicle control unit 330 supplies electric power to a motor that is a driving source of the vehicle 300 and other devices (not shown) that require electricity. Furthermore, when the vehicle 300 is connected to the external power supply device 200, the vehicle control unit 330 performs the charging and discharging in accordance with a request from the management device 100 or charging for raising the SOC of the on-vehicle battery 310 to a preset level. When the SOC is 100%, the on-vehicle battery 310 is fully charged.

The vehicle storage unit 340 stores vehicle information. The vehicle information includes at least one of information indicating a date and time at which the operation of the on-vehicle battery 310 is started, information indicating a date and time at which the on-vehicle battery 310 is registered, or information indicating a date and time at which the vehicle 300 is registered. The date and time at which the on-vehicle battery 310 is registered is, for example, a date and time at which the on-vehicle battery 310 is attached to the vehicle 300. In addition, the vehicle information includes battery information. The battery information includes, for example, information on an initial maximum capacity and a capacity at the time of a maximum storage of electric power of the on-vehicle battery 310.

The sensor 350 is, for example, a temperature sensor. The sensor 350 detects, for example, an ambient temperature of the on-vehicle battery 310, and outputs ambient temperature information indicating the detected ambient temperature to the vehicle control unit 330.

The connector 360 is connected to the second plug 224 of the cable 220.

Note that components of the control unit 120 of the management device 100 are realized by, for example, a hardware processor such as a central processing unit (CPU) executing a program (software). In addition, the vehicle control unit 330 of the vehicle 300 is realized by, for example, a hardware processor such as an electronic control unit (ECU) or a central processing unit (CPU) executing a program (software). A part or all of the control unit 120 and the vehicle control unit 330 may be realized by hardware (a circuit unit; including circuitry) such as a large scale integration (LSI), application specific integrated circuit (ASIC), a field-programmable gate array (FPGA), or a graphics processing unit (GPU), and may also be realized by cooperation of software and hardware. The program may be stored in advance in a storage device (a storage device having a non-transitory storage medium) such as a hard disk drive (HDD) or a flash memory, or may be stored in a detachable storage medium (a non-transitory storage medium) such as a DVD or a CD-ROM and installed by the storage medium being attached to a drive device.

[Example of Information Stored by Vehicle Storage Unit 340 of Vehicle 300]

Next, an example of information stored by the vehicle storage unit 340 of the vehicle 300 will be described. FIG. 2 is a diagram which shows an example of information stored in a vehicle storage unit 340 of a vehicle 300 according to the embodiment. As shown in FIG. 2, the vehicle storage unit 340 stores a registration date (at least one of information indicating a date and time at which an operation of the on-vehicle battery 310 is started, information indicating a date and time when the on-vehicle battery 310 has been registered, and information indicating a date and time when the vehicle 300 has been registered) and battery information in association with vehicle identification information.

[Example of Information Stored in the Storage Unit 130 of the Management Device 100]

Next, an example of information stored in the storage unit 130 of the management device 100 will be described. FIG. 3 is a diagram which shows an example of information stored in the storage unit 130 of the management device 100 according to the embodiment. As shown in FIG. 3, the storage unit 130 stores a first threshold value and a second threshold value in association with each remaining warranty period. For example, the storage unit 130 stores a first threshold value of 0.8 and a second threshold value of 0.9 in association with a remaining warranty period of 15 years. As described above, the second threshold value is a value larger than the first threshold value in the present embodiment. Note that the remaining warranty period may be a number of years as shown in FIG. 3, or may also be a number of months, a number of days, or a number of hours. In addition, the remaining warranty period may be a number of years according to a type of a vehicle or may be a number of years according to a country or region in which the vehicle is sold. Note that, although an example in which two threshold values are stored in association with each remaining warranty period has been described in the example shown in FIG. 3, there may be three or more threshold values. The threshold values may be, for example, three or more threshold values according to an ambient temperature. As described above, when the storage unit 130 stores three or more threshold values, the control unit 120 may read two or more threshold values from the three or more threshold values on the basis of information acquired from the vehicle 300.

[Example of Charging or Discharging State and Term of On-Vehicle Battery 310]

Figure 4:
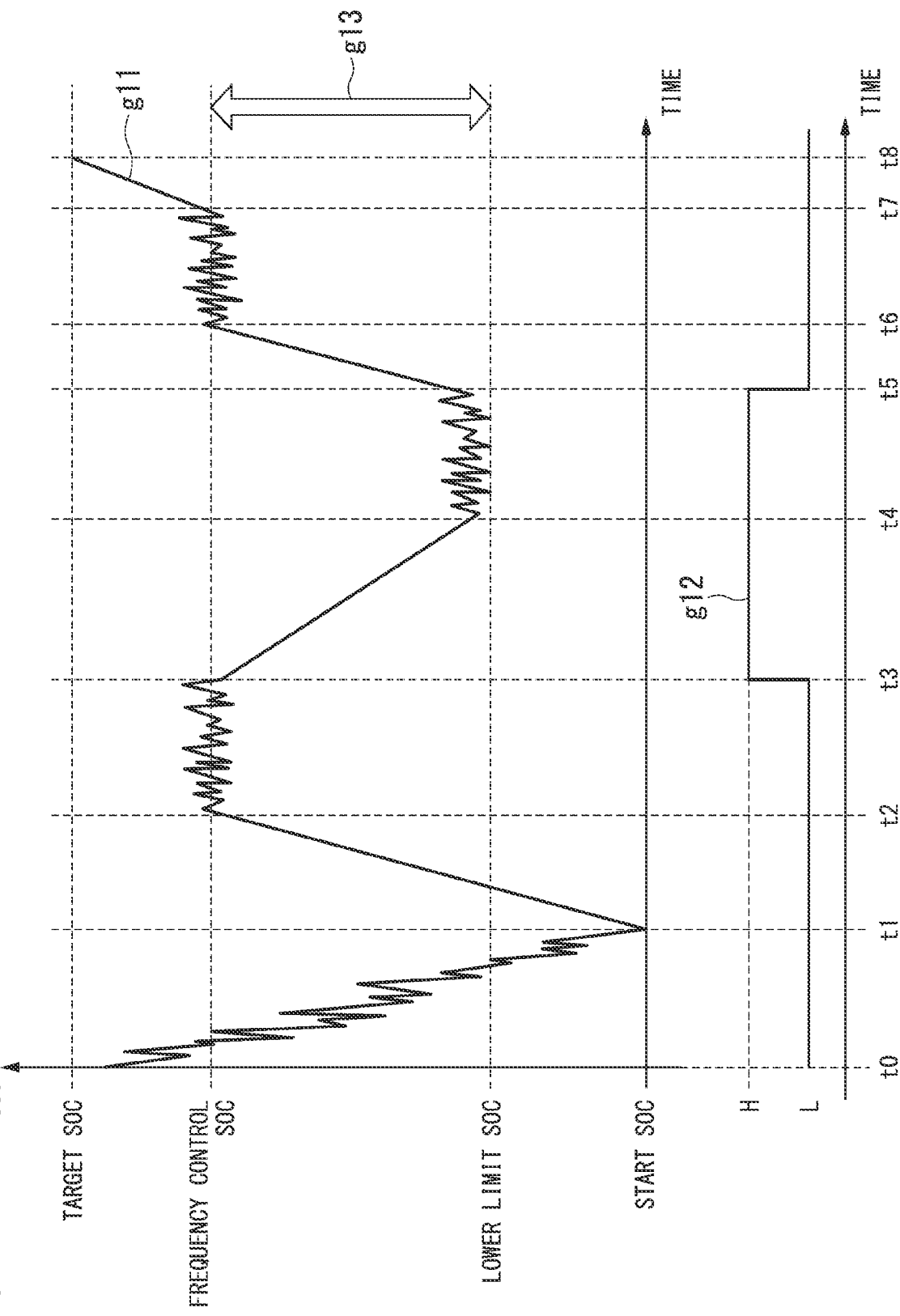
FIG. 4 is a diagram which shows an example of a charging or discharging state of an on-vehicle battery according to the embodiment.

Next, an example of a charging or discharging state and terms of an on-vehicle battery 310 will be described using FIG. 4. FIG. 4 is a diagram which shows an example of the charging or discharging state of the on-vehicle battery 310 according to the present embodiment. A symbol g11 indicates a state of change (SOC) with respect to time. In the symbol g11, the horizontal axis is a time (seconds). The vertical axis is an SOC (%). A symbol g12 represents a spinning reserve instruction. In the spinning reserve instruction, a period of an H (high) level is a period in which the spinning reserve instruction is made. In addition, in the spinning reserve instruction, the horizontal axis is time.

The target SOC is an SOC when the on-vehicle battery 310 is fully charged. The frequency control state of charge (frequency control SOC) is an SOC lower than the target SOC, and is an SOC based on the SOC setting instruction of the management device 100. Note that the frequency control SOC is a value set by a manufacturer of the vehicle 300. The lower limit state of charge (lower limit SOC) is an SOC lower than the frequency control SOC, and is a value set by, for example, a driver of the vehicle 300. The lower limit SOC is a value that can be output by the on-vehicle battery 310 with respect to an amount of electric power consumed by traveling a distance preset by the driver for the next time the vehicle 300 travels. A start SOC is an SOC lower than the lower limit SOC, and is an SOC when the electric power stored in the on-vehicle battery 310 is used up after the vehicle 300 has traveled.

The "spinning reserve" in V2G is acquired by the vehicle 300 continuously discharging a current amount that is not small. On the other hand, "frequency regulation" in V2G is realized by the vehicle 300 performing instantaneous and frequent switching between charging and discharging.

The vehicle 300 travels in a period from a time t0 to a time t1. As a result, the SOC decreases from a state close to the target SOC (fully charged) to the start SOC.

At the time t1, the vehicle 300 is connected to the external power supply device 200. In a period from the time t1 to a time t2, electric power of the on-vehicle battery 310 is stored by the V2G operation or normal charging.

At the time t2, the SOC reaches the frequency control SOC. As a result, in a period from the time t2 to a time t3, the vehicle control unit 330 performs frequency regulation control, which is control for frequency regulation in the frequency control SOC.

A period from the time t3 to a time t5 is a period in which the electric power company 400 performs the spinning reserve request. In a period from the time t3 to a time t4, the vehicle control unit 330 provides the electric power stored by the on-vehicle battery 310 to the transmission line 240 via the external power supply device 200 on the basis of the spinning reserve request from the management device 100. As a result, the SOC decreases from the frequency control SOC to the lower limit SOC.

In a period from the time t4 to the time t5, the vehicle control unit 330 performs frequency regulation control at the lower limit SOC.

At the time t5, the management device 100 cancels the spinning reserve instruction by switching the spinning reserve instruction from an H level to an L (low) level. Accordingly, the vehicle control unit 330 stores electric power in the on-vehicle battery 310 in a period from the time t5 to a time t6.

At the time t6, the SOC reaches the frequency control SOC. As a result, the vehicle control unit 330 performs frequency regulation control in the frequency control SOC in a period from the time t6 to a time t7.

In a period from the time t7 to a time t8, the vehicle control unit 330 controls the charging of the on-vehicle battery 310 until the target SOC is reached.

Note that a value of the frequency control SOC with respect to the target SOC is set to be low enough not to exceed the target SOC even though charging and discharging for frequency regulation in accordance with the frequency regulation instruction are performed when the SOC of the on-vehicle battery 310 is the frequency control SOC, and is set to be low such that a degree of influence caused by the deterioration of the on-vehicle battery 310 is equal to or less than a threshold value even though the charging and discharging are performed.

In addition, the degree of influence caused by the deterioration of the on-vehicle battery 310 that switches between charging and discharging in a short period of time increases as the SOC of the on-vehicle battery 310 increases. In addition, a maximum value of the SOC at which performance required when the on-vehicle battery 310 performs charging can be realized, for example, the SOC at which a predetermined amount of electric power can be continuously charged decreases as the temperature of the on-vehicle battery 310 decreases. For this reason, the vehicle control unit 330 may set the frequency control SOC to be lower as the ambient temperature of the on-vehicle battery 310 is lower according to a detection value of the sensor 350.

Note that the diagram shown in FIG. 4 is an image diagram of the charging and discharging of the on-vehicle battery 310. As will be described below, the frequency regulation control is performed at an SOC in accordance with the remaining performance of the on-vehicle battery 310. Moreover, the vehicle control unit 330 performs frequency regulation control when a frequency regulation instruction from the management device 100 is acquired.

[Remaining Warranty Period]

Next, an example of the method of calculating the remaining warranty period will be described. The control unit 120 of the management device 100 extracts a registration date (at least one of information indicating the date and time at which the operation of the on-vehicle battery 310 started, information indicating the date and time at which the on-vehicle battery 310 was registered, and information indicating the date and time at which the vehicle 300 was registered) included in the vehicle information acquired from the vehicle 300. Next, the control unit 120 calculates a number of years (or a number of days or hours) of use by subtracting the extracted registration date from a current date and time. Note that the control unit 120 acquires, for example, the current date and time via the network NW. Alternatively, when a time server (not shown) is connected to the management device 100, the control unit 120 may acquire the current date and time from the time server. Next, the control unit 120 calculates the remaining warranty period by subtracting a number of years (or a number of days or hours) of use from the predetermined number of years (or a number of days or hours) to be guaranteed.

In the example described above, the example in which the control unit 120 calculates the remaining warranty period has been described, but the present invention is not limited thereto. The vehicle control unit 330 may calculate the remaining warranty period and output the calculated remaining warranty period to the management device 100 via the cable 220, the external power supply device 200, and the network NW. In this case, the vehicle control unit 330 may acquire, for example, the current date and time from the management device 100, and when the vehicle has a Global Positioning System (GPS) receiver, it may extract the current date and time from information received by the GPS receiver.

[Remaining Battery Performance]

Next, an example of the method of calculating remaining battery performance will be described. The control unit 120 of the management device 100 extracts battery information included in the vehicle information acquired from the vehicle 300. Next, the control unit 120 calculates remaining battery performance on the basis of information on the initial maximum capacity and the capacity at the time of the maximum storage of electric power of the on-vehicle battery 310. For example, since the on-vehicle battery 310 is not deteriorated in an initial state, the initial maximum capacity matches the capacity at the time of the maximum storage of electric power. The control unit 120 calculates the remaining battery performance according to [1-{(initial maximum capacity)−(capacity at time of maximum storage of electric power)}/(initial maximum capacity)]. For example, if it is assumed that the initial maximum capacity is, for example, 62 (kWh), and the current capacity at the time of the maximum storage of electric power is 49.6 (kWh), the control unit 120 calculates the remaining battery performance as 0.8 (=1−(62−49.6)/62). In addition, the remaining battery performance in the initial state is about 1. The remaining battery performance when the capacity is halved is 0.5 (=1−(62−31)/62).

In the example described above, the example in which the control unit 120 calculates the remaining battery performance has been described, but the present invention is not limited thereto. The vehicle control unit 330 may calculate the remaining battery performance and output the calculated remaining battery performance to the management device 100 via the cable 220, the external power supply device 200, and the network NW.

Note that a method of calculating remaining battery performance described above is an example, and the present invention is not limited thereto. For example, the control unit 120 may calculate the remaining battery performance using the ambient temperature information detected by the sensor 350. For example, when the ambient temperature is lower than room temperature, the capacity at the time of a maximum storage of electric power is lower than room temperature. For this reason, the control unit 120 may correct the remaining battery performance by adding or multiplying a correction value in accordance with an ambient temperature as shown in FIG. 5 to or by the remaining battery performance. FIG. 5 is a diagram which shows an example of a correction value for each ambient temperature for a remaining battery performance according to the embodiment.

[Processing Procedure of Control Unit 120 of Management Device 100]

Figure 6:
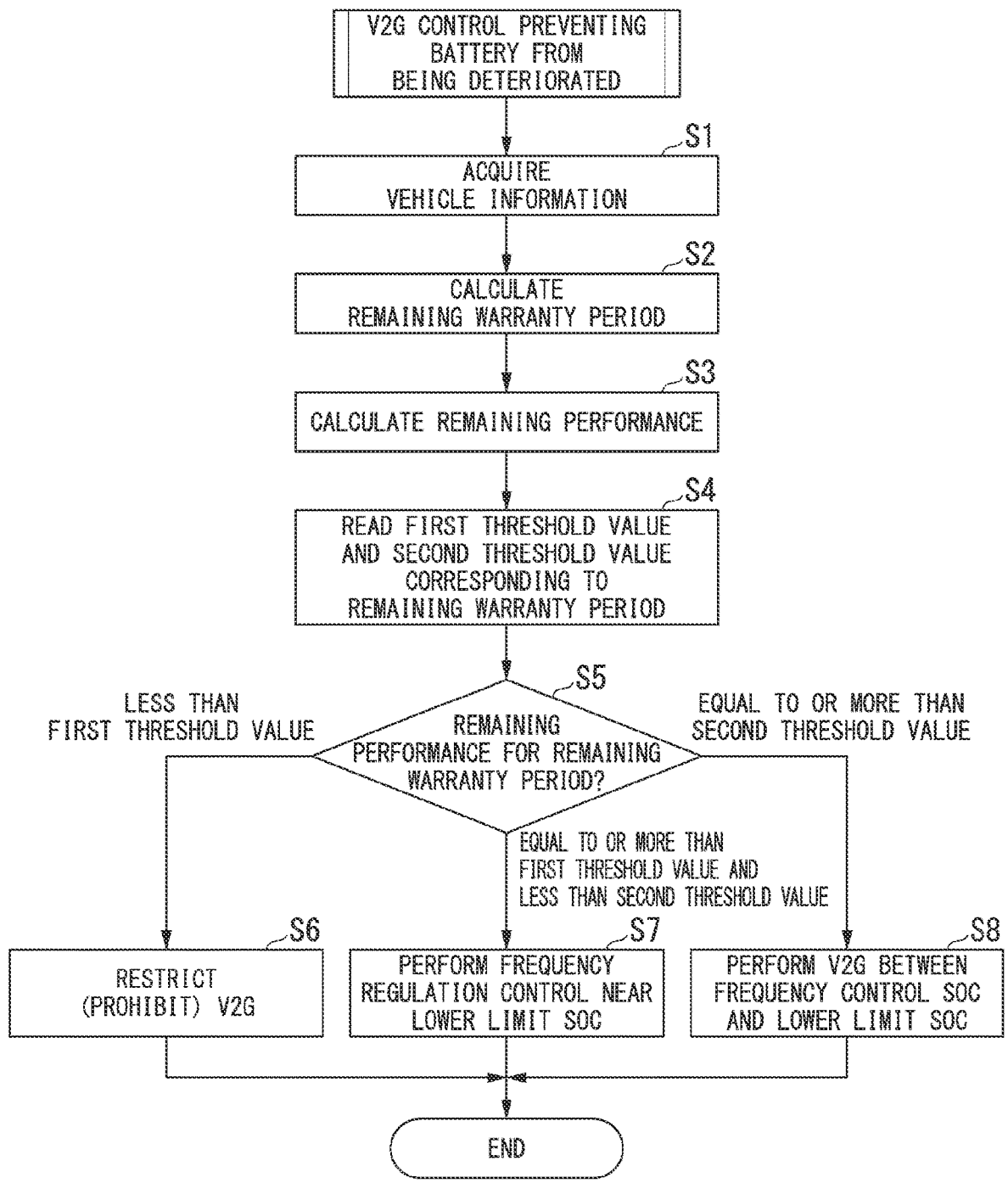
FIG. 6 is a flowchart of an example of a processing procedure of a control unit of the management device according to the embodiment.

Next, an example of a processing procedure of the control unit 120 of the management device 100 will be described. FIG. 6 is a flowchart of an example of the processing procedure of the control unit 120 of the management device 100 according to the present embodiment.

First, the control unit 120 acquires vehicle information from the vehicle 300 via the cable 220, the external power supply device 200, and the network NW (step S1). Note that the vehicle information includes, for example, identification information for identifying the vehicle 300.

Next, the control unit 120 calculates a remaining warranty period on the basis of a current date and time and a registration date and time included in the acquired vehicle information (step S2).

Next, the control unit 120 calculates remaining battery performance on the basis of battery information included in the acquired vehicle information (step S3). Note that the control unit 120 may perform step S2 and step S3 in a reverse processing order and may also perform the processing in parallel.

Next, the control unit 120 reads a first threshold value and a second threshold value corresponding to the remaining warranty period calculated in step S2 from the storage unit 130 on the basis of the acquired vehicle information (step S4).

Next, the control unit 120 compares the calculated remaining battery performance with the first threshold value and the second threshold value corresponding to the remaining warranty period read from the storage unit 130, thereby determining battery deterioration information (step S5).

Then, the control unit 120 restricts the transfer of electric power between the electric power system and the on-vehicle battery 310 when the remaining battery performance is less than the first threshold value. As a result, the control unit 120 restricts or prohibits V2G control (step S6). The control unit 120 performs control such that frequency regulation control is performed near a lower limit SOC when the remaining battery performance is equal to or more than the first threshold value and less than the second threshold value (step S7). The control unit 120 performs control such that V2G is performed between the frequency control SOC and the lower limit SOC when the remaining battery performance is equal to or more than the second threshold value (step S8).

Here, a specific example of control will be described with reference to FIG. 4.

When the remaining battery performance is equal to or more than the first threshold value and less than the second threshold value, the control unit 120 performs the frequency regulation control near the lower limit SOC as shown from the time t4 to the time t5 in FIG. 4. In addition, when the remaining battery performance is equal to or more than the second threshold value, the control unit 120 performs control such that V2G is performed between the frequency control SOC and the lower limit SOC as in symbol g13 in FIG. 4. As described above, in the present embodiment, when the use period of the on-vehicle battery 310 increases and the deterioration of the on-vehicle battery 310 progresses, it is possible to curb progress of the deterioration of the on-vehicle battery 310 by performing the frequency regulation control near the lower limit SOC. Note that, when the remaining performance of the on-vehicle battery 310 is equal to or more than the first threshold value and less than the second threshold value, the control unit 120 controls the state of charge of the on-vehicle battery 310 in a narrower range than when the remaining performance is equal to or more than the second threshold value.

Note that, in the example described above, the function of the management device 100 may be included in the external power supply device 200 or the vehicle 300.

In addition, in the example described above, when the SOC of the on-vehicle battery 310 when the frequency regulation instruction is acquired is within a range from the lower limit SOC to the frequency control SOC, the vehicle control unit 330 performs frequency regulation control at an SOC in accordance with the remaining battery performance. Moreover, when the SOC of the on-vehicle battery 310 when the spinning reserve instruction is acquired is within a range of the lower limit SOC to the target SOC, the vehicle control unit 330 performs control such that continuous discharging for providing a spinning reserve to the on-vehicle battery 310 in accordance with the spinning reserve instruction is performed on the electric power system.

As described above, in the present embodiment, it is assumed that the battery information and the information on the date and time at which the on-vehicle battery 310 is registered are acquired, and the current remaining battery performance and the remaining warranty period are calculated to set the SOC at the time of frequency regulation in accordance with these.

As a result, according to the present embodiment, it is possible to reduce the deterioration of the on-vehicle battery 310 (secondary battery) by securing a guarantee period of the secondary battery, and maintaining the travel of the vehicle while operating the V2G. In addition, according to the present embodiment, it is possible to reduce the deterioration of the on-vehicle battery 310 (secondary battery) by restricting or prohibiting the V2G control for the deteriorating on-vehicle battery 310 with a short remaining warranty period. Moreover, according to the present embodiment, since the on-vehicle battery 310 is deteriorated when the remaining battery performance is equal to or more than the first threshold value and less than the second threshold value, it is possible to perform control in accordance with the deterioration of the battery by performing control to perform frequency regulation near the lower limit SOC. Moreover, according to the present embodiment, since the on-vehicle battery 310 is deteriorated less when the remaining battery performance is equal to or greater than the second threshold value, it is possible to perform control in accordance with the deterioration of the battery by performing control to perform V2G between the frequency control SOC and the lower limit SOC.

Note that, although the operation example of V2G has been described in the embodiment and the modified example described above, the present invention is not limited thereto, and it may be applied to an operation of vehicle to home (V2H). Note that V2H is an operation in which electric power stored in the on-vehicle battery 310 is supplied to an inside of a house and used at the house. When V2H is operated, the vehicle control unit 330 provides electric power from the vehicle 300 to the user's home 260 via the transmission line 240 according to a result of the user operating the vehicle 300 or the external power supply device 200.

As described above, the embodiments for implementing the present invention have been described using the embodiments, but the present invention is not limited to these embodiments at all, and various modifications and substitutions may be made within a range not departing from the gist of the present invention.

What is claimed is:

1. A management device which manages transfer of electric power between an electric power system and a secondary battery that is mounted in a vehicle and stores electric power for travel, comprising:
an acquisition unit configured to acquire remaining performance of the secondary battery and information indicating a use period of the secondary battery; and
a control unit configured to acquire two or more threshold values corresponding to period information based on a use period of the secondary battery from reference information in which two or more threshold values are associated with the period information based on the use period of the secondary battery, compare remaining performance of the secondary battery with each of the two or more acquired threshold values, and control transfer of electric power between the electric power system and the secondary battery on the basis of a result of the comparison.

2. The management device according to claim 1,
wherein the two or more threshold values include a first threshold value, and a second threshold value indicating that the remaining performance is higher than the first threshold value, and
the control unit restricts the transfer of electric power between the electric power system and the secondary battery when the remaining performance of the secondary battery is less than the first threshold value.

3. The management device according to claim 1,
wherein the two or more threshold values include a first threshold value, and a second threshold value indicating that the remaining performance is higher than the first threshold value, and
the control unit controls, when the remaining performance of the secondary battery is equal to or more than the first threshold value and less than the second threshold value, a state of charge of the secondary battery in a narrower range than when the remaining performance is equal to or more than the second threshold value.

4. The management device according to claim 1,
wherein the two or more threshold values include a first threshold value, and a second threshold value indicating that the remaining performance is higher than the first threshold value,
the control unit performs control such that frequency regulation control for maintaining a constant frequency of the electric power system is performed on the vehicle near a lower limit state of charge when the remaining performance of the secondary battery is equal to or more than the first threshold value and less than the second threshold value, the lower limit state of charge being a state of charge at which the secondary battery can output an amount of electric power consumed by traveling a distance preset by a driver for the next time the vehicle travels.

5. The management device according to claim 1,
wherein the two or more threshold values include a first threshold value, and a second threshold value indicating that the remaining performance is higher than the first threshold value,
the control unit performs control such that frequency regulation control for maintaining a constant frequency of the electric power system is performed on the vehicle between a frequency control state of charge having a state of charge higher than a lower limit state of charge and the lower limit state of charge when the remaining performance of the secondary battery is equal to or more than the second threshold value, the lower limit state of charge being a state of charge at which the secondary battery can output an amount of electric power consumed by traveling a distance preset by a driver for the next time the vehicle travels.

6. A management method comprising:
by a management device that manages transfer of electric power between an electric power system and a secondary battery that is mounted in a vehicle and stores electric power for travel,
acquiring remaining performance of the secondary battery and information indicating a use period of the secondary battery;
acquiring two or more threshold values corresponding to period information based on the use period of the secondary battery from reference information in which two or more threshold values are associated with the period information based on the use period of the secondary battery;
comparing the remaining performance of the secondary battery with each of the two or more acquired threshold values; and
controlling the transfer of electric power between the electric power system and the secondary battery on the basis of a result of the comparison.

7. A computer-readable non-transitory storage medium which stores a program causing a computer of a management device that manages transfer of electric power between an electric power system and a secondary battery that is mounted in a vehicle and stores electric power for travel to
acquire remaining performance of the secondary battery and information indicating a use period of the secondary battery;
acquire two or more threshold values corresponding to period information based on the use period of the secondary battery from reference information in which two or more threshold values are associated with the period information based on the use period of the secondary battery,
compare the remaining performance of the secondary battery with each of the two or more acquired threshold values; and
control the transfer of electric power between the electric power system and the secondary battery on the basis of a result of the comparison.

* * * * *